United States Patent Office 3,341,554
Patented Sept. 12, 1967

3,341,554
PROCESS FOR PREPARING CARBOXYLIC ACIDS
Kenneth J. Murray, East Brunswick, and Allen R. Kittleson, Westfield, N.J., assignors to Esso Research and Engineering Company, a corporation of Delaware
No Drawing. Filed Nov. 1, 1963, Ser. No. 320,928
9 Claims. (Cl. 260—343.6)

This invention relates to an improved method for preparing carboxylic acids and more particularly to a method for making 2,2,4-trimethylglutaric acid compounds.

Difunctional compounds, particularly dicarboxylic acids, are of considerable current interest in such areas as plasticizers, synthetic lubricants, polyesters and polyamides. Replacement of all or a major proportion of the hydrogen atoms on the carbon atoms adjacent the carboxyl groups with alkyl groups renders these difunctional compounds even more valuable because such substitution markedly improves the thermal and hydrolytic stability of these compounds.

As indicated in U.S. Patent 2,820,821 issued January 21, 1958, a practicable method for the production of glutaric acid, including lower alkyl substituted and halogen substituted glutaric acids containing a total of up to seven carbon atoms or the anhydrides thereof has long been sought for. An extensive review is given in column 1, line 46 to column 2, line 47 of said patent of methods previously proposed for these preparations and the patent then discloses the preparation of these compounds by the oxidation of glutaraldehydes by means of molecular oxygen. Unfortunately, however, none of these procedures has been found suitable for commercial operation for various reasons, such as costly reactants, low yields, low quality of the product and costly equipment made necessary by the corrosive reactants.

It is the object of this invention to provide a novel method for preparing certain substituted glutaric acids.

More specifically, this invention describes a novel and economic method for preparing 2,2,4-trimethylglutaric acid compounds, particularly 2,2,4-trimethylglutaric acid-γ-lactone and 2,2,4-trimethylglutaric acid.

It has now been found that 2,2,4-trimethylglutaric acid can be readily and economically prepared by reacting mesityl oxide with one mole of HCN under alkaline conditions to form mesitonitrile and then reacting the latter with another mole of HCN in acid media in order to form 2,2,4-trimethyl-4-cyano-γ-butyrolactone. The latter upon hydrolysis is converted to 2,2,4-trimethyl-γ-glutaric acid lactone which upon catalytic reduction in an alkaline medium yields 2,2,4-trimethylglutaric acid. The acid thus obtained had a melting point of 101–102° C. (uncorrected) and a neutralization equivalent (N.E.) of 89.6.

The following reactions may be utilized in the preparation of 2,2,4-trimethylglutaric acid in accordance with the present invention.

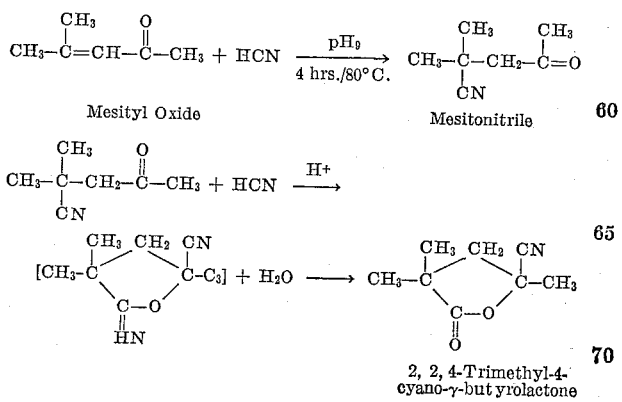

2, 2, 4-Trimethyl-4-cyano-γ-butyrolactone

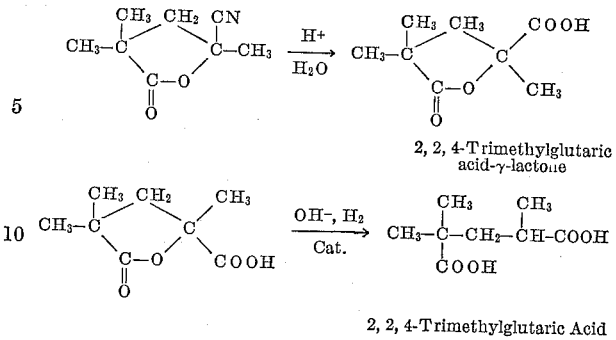

2, 2, 4-Trimethylglutaric acid-γ-lactone 2, 2, 4-Trimethylglutaric Acid

Mesityl oxide, which is readily prepared by known processes, is first reacted with hydrogen cyanide under alkaline conditions. The base catalyzed addition of hydrogen cyanide to mesityl oxide is extremely sensitive to reaction conditions. The products and their yields depend upon the temperature, pH, time, solvent and ratio of reactants. The conditions for the conversion of mesityl oxide to mesitonitrile are as follows:

|  | Range | Preferred |
|---|---|---|
| Molar ratio of HCN to mesityl oxide | Between 1 and 3 | 1. |
| pH | 8 to 13 | 9 to 10. |
| Temp., °C | 0 to 120 | 80. |
| Time, hrs | 1 to 24 | 4. |

The solvents which may be used are water, methanol/water, ethanol/water, dioxane/water and the like. The preferred solvent is a 50% ethanol/water solution and under the above preferred condtions gives about 28 mole percent mesitonitrile yields with a selectivity of about 74 mole percent.

The conversion of the mesitonitrile to 2,2,4-trimethyl-4-cyano-γ-butyrolactone is likewise greatly affected by the reaction conditions especially pH. The conditions for the conversion to the cyano-lactone are as follows:

|  | Range | Preferred |
|---|---|---|
| Molar ratio of HCN to mesitonitrile | Between 1 and 3 | 1. |
| pH | 6 to 1 | 2 to 1. |
| Temp., °C | −10 to 100 | 0 to 20. |
| Time, hrs | ¼ to 24 | 1. |

Another possible route to the 2,2,4-trimethyl-4 cyano-γ-butyrolactone is from mesitonic acid. This acid may be readily produced by the hydrolysis of mesitonitrile

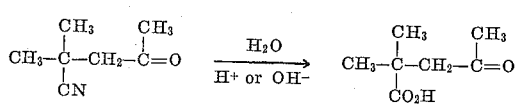

The acid when reacted with HCN in acidic media yields the desired 2,2,4 - trimethyl - 4 - cyano-γ-butyrolactone.

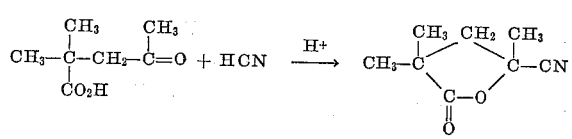

Under certain circumstances the mesitonic acid route to the cyano-butylolactone may be preferred either because of the availability of the acid or ease of isolation of the products from its acidic reaction with cyanide.

The conditions for the conversion of mesitonic acid to the 2,2,4-trimethyl-4-cyano-γ-butyrolactone are as follows:

|  | Range | Preferred |
|---|---|---|
| Molar ratio of HCN to mesitonic acid | Between 1 and 3 | 1. |
| pH | 6 to 1 | 3 to 1. |
| Temp., ° C | −10 to 100 | 0 to 20. |
| Time, hrs | ¼ to 24 | 1. |

As in the earlier steps, pH again plays an important role in the conversion of the 2,2,4-trimethyl-4-cyano-γ-butyrolactone to the glutaric acid lactone. The reaction must be carried out in acidic media since the use of base destroys the lactone structure. The reaction can be most conveniently carried out in an aqueous medium at a temperature of 25 to 100° C., preferred 80 to 100° C. and a pH of from 6 to 1, preferably at 3 to 1. Any acid may be used, carboxylic or mineral, but a mineral acid such as HCl or $H_2SO_4$ is most convenient.

The final step in the process is accomplished by a catalytic hydrogen of the salt of the acid lactone. The catalysis can be carried out in aqueous media in the presence of an excess of an alkali metal or alkaline earth metal hydroxide, preferably sodium hydroxide at temperatures between 150 and 300° C., preferably at 225 to 275° C., a reaction time of 1 to 24 hours may be used but 1 to 4 hours is preferred. The catalyst may be chosen from a metal selected from the group consisting of Pt, Ru, Pd or Ni, but studies indicate that Ru is best. The catalytic metal is preferably dispersed upon a base or support which is resistant to hot alkalies. Carbon or charcoal is preferred as the catalyst support although kieselguhr and diatomaceous earth may also be used. Thus, it is clear that the present invention envisions the use, as a catalyst support, of a material selected from the group consisting of carbon and diatomaceous earth, with charcoal and kieselguhr being merely species thereof. The catalyst can be used in a concentration of from 0.05 weight percent to 10 weight percent, preferred 2 to 6 weight percent at $H_2$ pressures of 100 to 10,000 p.s.i., preferred 1000 to 2500 p.s.i. The quantity of catalyst used may vary from about 1 to 25 weight percent based upon the acid lactone to be hydrogenated.

The process may be simplified by combining a number of steps. Mesitonitrile may be directly converted to the acid lactone. This conversion may be carried out by reacting the mesitonitrile with HCN and heating the reaction mixture. Heating the reaction mixture assists the hydrolysis of the intermediately formed cyano-lactone thus producing the acid lactone

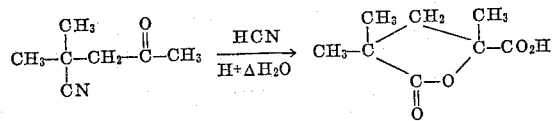

The conditions for the conversion of the mesitonitrile to the acid lactone are as follows:

|  | Range | Preferred |
|---|---|---|
| Molar ratio of HCN to mesitonitrile | Between 1 and 3 | 1. |
| pH | 6 to 1 | 3 to 1. |
| Temperature, ° C | 0 to 120 | 10 to 100. |
| Time, hrs | 1 to 24 | 2 to 3. |

Similarly mesitonic acid may be converted directly to the acid lactone

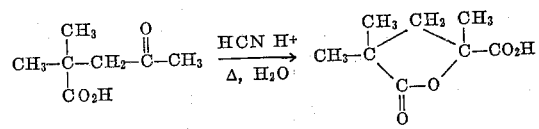

The conditions for this conversion are the same as that for the mesitonitrile conversion.

The following examples are illustrative of the present invention.

Example 1

A one liter flask equipped with a reflux condenser, stirrer, thermometer and pH electrodes was charged with 500 cc. of 50% ethanol/water and 1.1 moles (53.9 gms.) of sodium cyanide. One mole (98 gms.) of mesityl oxide was added and the reaction rapidly adjusted with HCl to pH of 9–10 and temperature of 80° C. The reaction was allowed to run for 4 hours, during which the pH and temperature were constantly maintained. After the reaction was completed the alcohol was stripped. The alcohol stripping was then sent out for V.P.C. analysis to determine the concentration of unreacted mesityl oxide.

The aqueous phase was acidified (pH 1) and extracted with ether and dichloromethane. The organics were combined and dried over $MgSO_4$.

After the solution was dried, the $MgSO_4$ and solvent were removed and the product either distilled, if liquid, or recrystallized to obtain the yield. Under these conditions 62 mole percent of the mesityl oxide were unreacted and 28.2 mole percent of mesitonitrile were obtained with a selectivity of 74 mole percent.

A round bottom flask equipped with stirrer, thermometer, condenser and addition funnel was charged with 25 gms. of mesitonitrile (0.2 mole) and 9.8 gms. of sodium cyanide (0.2 mole) in 50 cc. of water. The reaction temperature was lowered to 15° C. by ice cooling and 20 gms. of conc. sulfuric acid in 47 cc. of water was then added dropwise to the mixture over a period of 35 minutes. The 15° C. temperature was maintained throughout the addition.

After 40 minutes of stirring at room temperature, the reaction mixture was extracted with ether and the organic phase separated and dried over $MgSO_4$.

The $MgSO_4$ was filtered and the ether stripped leaving 28.35 gms. of a clear, colorless liquid. An I.R. indicated that the liquid contained a lactone carbonyl, a normal carbonyl and also an organic nitrile. The liquid was subjected to a vacuum distillation but no separation could be obtained. All the liquid boiled at 68–70° C. at 0.4 mm. A V.P.C. analysis of the liquid indicated that it was 42.9% mesitonitrile, 55.1% 2,2,4-trimethyl-4-cyano-γ-butyrolactone and 2% of a higher boiler. Separation is achieved by a careful distillation at pressures of about 100 to 200 mm. of Hg.

The lactone (B.P. 112° C. at 6.9 mm.; $n_D^{20}$=1.4392; M.P. 26–27° C.) was analyzed for $C_8H_{11}NO_2$.—Expected: C=62.72, H=7.24, N=9.15. Found: C=62.59, H=7.34, N=8.81. The infra-red spectra of the lactone indicated the expected carbonyl bond at 5.5μ and the absence of a nitrile bond at 4.5μ. The latter occurs because nitriles attached to carbon atoms attached to either oxygen or nitrogen do not give the normal nitrile absorption.

The lactone formation appears to be equilibrium controlled since changes in reaction variables have little or no effect on the ratio of product to starting material ($k$ e.g. is slightly greater than 1).

The cyano-lactone (25 gms., 0.163 mole) was mixed with 100 cc. of 33% HCl and refluxed for 4 hours. The initially heterogeneous reaction became homogeneous during the reaction. The solution was cooled and extracted three times with ether. The ether extracts were combined and dried over MgSO$_4$. Removal of the ether and drying agent produced 26.6 gms. of a solid, M.P.=98° C., 95 mole percent yield. The infra-red spectra of the solid indicated that it was probably the acid lactone (2,2,4-trimethyl-γ-glutaric acid lactone). Analysis for C$_8$H$_{12}$O$_4$.— Expected: C=55.80, H=7.02. Found: C=55.63, H=7.02; N.E., expected: 172. Found: 173.9. This glutaric acid lactone, not previously known, can be converted to 2,2,4-trimethylglutaric acid or it may be esterified to form solvents, plasticizers or synthetic lubricants.

Forty-four grams of pure 2,2,4-trimethyl-γ-glutaric acid lactone (0.256 mole) was refluxed overnight with 84 gms. of 50% NaOH (1.05 moles) in 100 cc. of water. The solution was cooled and 5.5 gms. of 5% ruthenium on carbon was added. The solution was then made up to 160 cc. with water and placed in a 300 ml. microbomb. The bomb was sealed, placed in a rocker, pressured up to 1900 p.s.i.g. with H$_2$ and then heated to 250° C. In 24 hours there was a total uptake of 625 p.s.i.g. (expected 660)

The bomb was cooled, vented and the catalyst filtered off. The aqueous solution was acidified with HCl and there was an immediate precipitation. The ppt. was filtered and 40.9 gms. of crude 2,2,4-trimethylglutaric acid was obtained. The aqueous phase was extracted with ether and the ether phase dried over MgSO$_4$. The work up of the ether extract yielded an additional 7 gms. of crude acid.

The crude acids were combined and recrystallized from dichloromethane. There was 36.0 gms. of pure, dry α,α,α'-trimethylglutaric acid obtained (81% yield), M.P. 101–102° C uncorrected, Lit.: 98.5–99.5° C.; N.E., Lit.: 87.0. Found: 89.6.

Analysis C$_8$H$_{14}$O$_4$.—Lit.: C=55.16, H=8.10. Found: C=54.78, H=7.93.

The acid anhydride was also prepared by reacting the acid with acetic anhydride. The glutaric acid anhydride melted in a sealed tube at 95° C., Lit.: 95–96° C.

Analysis C$_8$H$_{12}$O$_3$.—Lit.: C=61.52, H=7.75. Found: C=61.57, H=7.78.

*Example 2*

The 2,2,4-trimethylglutaric acid was also prepared in 75% yield by heating the 2,2,4-trimethylglutaric acid-γ-lactone with sodium hydroxide in a bomb at 250° C. for one hour, then adding the hydrogen. This procedure eliminates one step and gives a comparable yield of pure di-acid.

Raney nickel was also used for the hydrogenation. While it worked to some extent (20%), it was not as good as the ruthenium catalyst.

*Example 3*

In a manner similar to that employed in Example 1, 50 gms. (0.35 mole) of mesitonic acid, prepared by the hydrolysis of mesitonitrile, was reacted with 25 gms. (0.51 mole) of sodium cyanide and 0.5 mole of sulfuric acid in water. The reaction mixture was extracted with diethyl ether and the organic phase dried over MgSO$_4$. The ether and MgSO$_4$ were removed leaving 52.3 gms. of an orange liquid.

The liquid was transferred to a distillation flask and vacuum distilled. There was 29.5 gms. of the cyano lactone obtained, B.P. 109–110.5° C. at 5.2 mm. and 16.1 gms. of unreacted mesitonic acid recovered. Yield of 2,2,4-trimethyl-4-cyano-γ-butyrolactone was 0.192 mole (68% conversion with 81% selectivity).

*Example 4*

A round bottom flask was charged with 36 gms. (0.29 mole) of mesitonitrile, 22 gms. of NaCN and 160 cc. of H$_2$O. To this stirred solution, at 15° C., was added one mole of H$_2$SO$_4$ in 100 cc. of H$_2$O. The reaction mixture was heated at reflux for 5 hours. After a normal work-up there was 13.3 gms. of the 2,2,4-trimethyl-γ-glutaric acid lactone obtained, boiling point 125 to 127° C. at 0.1 mm.

The present invention is not limited to the foregoing specific embodiments since numerous variations can be made without departing from the spirit and scope of this invention as defined in the following claims.

What is claimed is:

1. The method for preparing 2,2,4-trimethylglutaric acid compounds which comprises reacting a member of the group consisting of mesitonitrile and mesitonic acid with hydrogen cyanide at a pH of 1 to 6 at a temperature of from 0 to 120° C. for a period of from about 1 to 24 hours thereby forming 2,2,4-trimethylglutaric acid lactone and reducing the latter with hydrogen in contact with a metal hydrogenation catalyst consisting essentially of a metal selected from the group consisting of ... ruthenium, platinum, palladium, and nickel and in the presence of an excess of an alkali metal hydroxide at elevated temperatures and pressures to form the alkali metal salt of 2,2,4-trimethylglutaric acid.

2. The method as defined in claim 1 in which the metal hydrogenation catalyst consists essentially of ruthenium upon carbon.

3. A method according to claim 1 wherein said catalyst is supported on a material selected from the group consisting of carbon and diatomaceous earth.

4. An improved method for preparing 2,2,4-trimethylglutaric acid and its salts which comprises reacting mesityl oxide and hydrogen cyanide in the presence of an alkali metal hydroxide at a pH of about 9 to 10 at a temperature of about 50 to 80° C. for about 4 hours to form mesitonitrile, reacting mesitonitrile with hydrogen cyanide under acidic conditions to form 2,2,4-trimethyl-4-cyano-γ-butyrolactone, reacting the latter with acid to form 2,2,4-trimethyl-γ-glutaric acid lactone and reducing the latter with hydrogen in the presence of a metal hydrogenation catalyst consisting essentially of a metal selected from the group consisting of ... ruthenium, platinum, palladium, and nickel and an excess of an alkali metal hydroxide at elevated temperatures and pressures to form the alkali metal salt of 2,2,4-trimethylglutaric acid.

5. The method as defined in claim 4 in which the metal hydrogenation catalyst consists essentially of ruthenium upon carbon.

6. An improved method for preparing 2,2,4-trimethylglutaric acid and its salts which comprises reacting mesityl oxide and hydrogen cyanide in the presence of an alkali metal hydroxide at a pH of about 9 to 10 at a temperature of about 50 to 80° C. for about 4 hours to form mesitonitrile, hydrolyzing the mesitonitrile to mesitonic acid, reacting the mesitonic acid with hydrogen cyanide under acidic conditions to form 2,2,4-trimethyl-4-cyano-γ-butyrolactone, reacting the latter with acid to form 2,2,4-trimethyl-γ-glutaric acid lactone and reducing the latter with hydrogen in the presence of a metal hydrogenation catalyst consisting essentially of a metal selected from the group consisting of ... ruthenium, platinum, palladium, and nickel and an excess of an alkali metal hydroxide at elevated temperatures and pressures to form the alkali metal salt of 2,2,4-trimethylglutaric acid.

7. The method as defined in claim 6 in which the metal hydrogenation catalyst consists essentially of ruthenium upon carbon.

8. The process which comprises reacting mesitonic acid in an aqueous medium with HCN in a molar ratio of from about 1:1 to about 1:3 at a pH of from 1 to 6 at a temperature of from about 0 to 20° C. for from about one hour, maintaining the aqueous medium at a temperature of from about 25 to 100° C. for a period sufficient to convert the reaction product to 2,2,4-trimethylglutaric acid-γ-lactone and reducing the latter with hydrogen in the presence of a metal hydrogenation catalyst consisting essentially of a metal selected from the group consisting of . . . ruthenium, platinum, palladium, and nickel and an excess of an alkali metal hydroxide at elevated temperatures and pressures to form the alkali metal salt of 2,2,4-trimethylglutaric acid.

9. The process as defined in claim 8 in which the metal hydrogenation catalyst consists essentially of ruthenium upon carbon and the reduction is effected at between 150 and 300° C.

References Cited

Auwers, Annalen der Chemie, vol. 292 (1896), pp. 222–3.

Auwers et al.: Berichte, vol. 23 (1890), p. 307.

Iwanami et al.: Kogyo Kagaku Zasshi, vol. 65 (1962), pp. 1492–6.

WALTER A. MODANCE, *Primary Examiner.*

NICHOLAS S. RIZZO, *Examiner.*

J. A. PATTEN, *Assistant Examiner.*